INVENTOR.
SAM H. WONG

ATTORNEY

United States Patent Office 3,419,870
Patented Dec. 31, 1968

3,419,870
DUAL-PLANE FREQUENCY-SCANNED ANTENNA ARRAY
Sam H. Wong, Los Angeles, Calif., assignor to North American Rockwell Corporation, a corporation of Delaware
Filed May 24, 1965, Ser. No. 458,113
9 Claims. (Cl. 343—768)

ABSTRACT OF THE DISCLOSURE

A dual-plane frequency-scanned antenna array employing a single continuous regularly-folded radiating feedline having a plurality of radiating elements arranged in a coplanar matrix.

---

In the utilization of a radar system to obtain direction information concerning a detected target, the prior art has employed a highly-directional antenna (e.g., one having a narrow beamwidth), which antenna is caused to periodically directionally scan through a selected angle in a preselected plane. As is well understood in the art, the direction of a detected target is thus detected to within an accuracy which is limited by the antenna beamwidth. By scanning in two mutually orthogonal directions (for example, nodding the antenna through an elevation angle while less rapidly scanning the antenna through an azimuth angle), the two components of the target direction angle may be determined. In the prior art, such less rapid azimuth scan has been provided by mechanically driving the antenna, while the more rapid elevation scanning or nodding has been provided by periodical frequency variation of the energy transmitted by a frequency-sensitive antenna. Such single plane frequency scanning is well known in the art, being described more fully, for example, in U.S. Patent No. 3,039,097, issued June 12, 1962, to Strumwasser and Van Latta for a Frequency-Sensitive Rapid Scanning Antenna, U.S. Patent No. 3,029,432, issued Apr. 10, 1962, to Hansen for a Scanning Antenna, and U.S. Patent No. 2,676,257, issued Apr. 20, 1954, to Hebenstreit for a Microwave Antenna Array.

The data rate or speed at which such prior art arrangement can scan through a selected volume (represented by the scanned elevation and azimuth angles) is yet limited by the speed at which the mechanical drive means can cyclically drive the inertia of the antenna. In other words, the advantages of a high-speed frequency scan are obtained in a first direction only, the prior-art device yet suffering the weight, cost and low-data rate associated with the utilization of a mechanical scan device for scanning in a second direction mutually orthogonal with the first.

By means of the concept of the subject invention, the disadvantages of such prior mechanical scanning are avoided altogether, and frequency sensitive scanning is provided in two mutually orthogonal directions.

Although frequency-controlled dual-plane scanning devices have been achieved in the prior-art, such devices have relied on the use of large, heavy helix line arrays to provide a separate frequency sensitive feedline in one dimension of a two-dimensional array or matrix of stacked linear arrays, as shown more fully in FIGS. 2 and 6a of an article, "Doubly Dispersive Frequency Scanning Antenna" by J. Croney at pp. 76–80 of the July 1963 issue of Microwave Journal, published by Horizon House of Dedham, Mass. Such devices are inefficient, mechanically complicated in design; and are bulky and heavy because of the reliance upon such frequency-sensitive helix feedline. Because each of several coplanar linear arrays is separately excited by the helix feedline, a separate power dissipating termination impedance is required for each linear array, as well as for the feedline itself, thereby resulting in a low power efficiency. Also, because of such inefficiency, bulk and weight, such devices are not optimally suited for airborne application. Further, such inefficiency and bulk tend to discourage their use in frequency-scanned monopulse antenna applications.

By means of the concept of the subject invention, a simpler, highly efficient, compact and light weight dual-plane antenna is provided, which avoids the disadvantages of prior frequency-controlled scanning antennas.

In a preferred embodiment of the invention, there is provided a frequency controlled dual-plane scanned antenna for providing a directional beam pattern selectively steerable through a scanning angle in each of two mutually orthogonal directions, and comprising a regularly folded feedline having a coplanar plurality of serially-interconnected lineal arrays of mutually spaced radiating elements.

In normal operation of the above described arrangement, the cyclical variation of the frequency pulsed microwave energy supplied to an input of the folded feedline causes directional scanning of the transmitted beam in a plane parallel to a lineal array and normal to the plane of the coplanar plurality of arrays, due to the phase dispersion thereof. Concurrently, the beam is more rapidly-scanned in a direction perpendicular to both the above mentioned planes due to the increased phase-dispersion provided by the folded feedline in such direction. By means of such arrangement, wherein the folded feedline provides an increased phase dispersion in a second direction relative to that in a direction parallel to the lineal arrays of radiating elements, a highly efficient dual-plane scanning function is provided. Also, such efficient structure is efficiently lightweight as to be suitable for airborne applications of a dual-plane frequency-scanning antenna. Further, because a single continuous feedline is employed, only a single termination impedance is required, thereby providing an improved power efficiency, and allowing a lighter weight design requiring less power. Moreover, it is possible to employ a plurality of such devices in a monopulse configuration, whereby the direction of a target located within the antenna beamwidth may be more precisely determined. Accordingly, it is an object of the subject invention to provide an improved frequency-sensitive antenna adapted to scanning in two mutually orthogonal directions.

It is another object of the invention to provide a highly efficient frequency-sensitive dual-plane scanning antenna which rapidly scans in one of two mutually orthogonal directions and more rapidly scans in the second one of such directions in response to a controlled frequency change.

It is still another object of the invention to provide a dual-plane frequency-controlled scanning antenna in which the phase dispersive arrays for scanning in one direction comprise delay elements in the phase dispersive arrays for scanning in a mutually orthogonal direction.

It is a further object of the invention to provide a dual-plane freqeuncy-controlled scanning antenna having an efficient and lightweight configuration.

It is yet another object to provide a dual plane frequency-sensitive monopulse antenna assembly for determining the direction of a target located within the antenna beamwidth.

It is still a further object of the invention to provide a frequency-controlled, dual-plane scanning array which requires less terminating impedance.

These and other objects of the invention will become apparent from the following description, taken together with the accompanying drawings in which.

In the figures, like reference characters refer to like parts.

Figure 1:
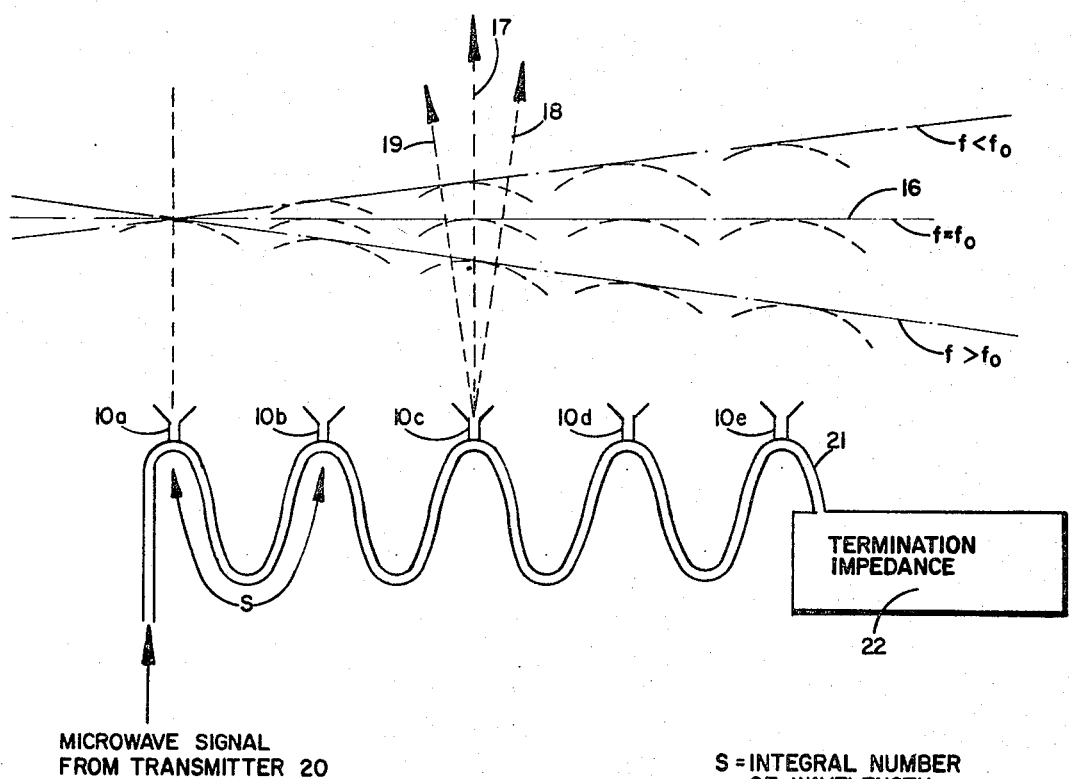
FIG. 1 is a diagram illustrating the variation of the phase front radiated from a single serpentine array, with variations in the frequency of the radiated energy.

The frequency sensitive directional properties of a serpentine array may be more easily appreciated by reference to FIG. 1.

Referring to FIG. 1, there is illustrated schematically a microwave serpentine radiative array, comprising a lineal array of radiating elements 10 commonly connected to a source 20 of radio-frequency (RF) energy-to-be transmitted by means of a folded microwave feed section 21 referred to as a serpentine feed section, which is terminated into a non-reflective terminating impedance 22, as is understood in the art. A fixed lineal spacing is employed between successive elements of the array of radiating elements 10, while a fixed relative phase is employed between mutually adjacent feedpoints of the serpentine feed section to each of which a corresponding radiating element 10 is connected in microwave circuit. Where the fixed relative phase is equal, for example, to an integral number of wavelengths of a selected radio frequency $f_0$, the energy transmitted from all of the radiating elements will be mutually in phase, thereby describing a planar wavefront 16 parallel to the linear array, and travelling perpendicularly thereto. Such perpendicular or broadside direction propagation occurs only for such frequencies for which the relative phase difference S corresponds to an integral number of wavelengths, which frequency is referred to herein as the broadside frequencies.

If the frequency of the RF energy is changed from a broadside frequency $f_0$, then the direction of the relative phase angle between adjacent ones of successive radiating elements 10 is changed, thereby causing a change of the direction of propagation in the plane of the illustration of FIG. 1. For example, if the transmitted frequency $f$ is increased above a broadside frequency $f_0$, then the relative phase angle between successive radiating elements is correspondingly increased by an incremental amount, whereby each successive element is increasingly delayed relative to that element nearest the RF source (element 20. Thus, for $f>f_0$, the direction 18 of propagation is toward the terminated end of the serpentine end of the serpentine feed element 21 (to the right as illustrated in FIG. 1). Similarly, for transmitted frequencies less than the broadside frequency (i.e., $f<f_0$), the direction of propagation 19 is rotated toward the left or the input end of the serpentine feed. Hence, a selected transmitter frequency corresponds to a given (azimuth) direction for the antenna of FIG. 1; and azimuth scanning of the antenna can be achieved by simply progressively changing, or programming, the transmitter frequency.

The construction and arrangement of a serpentine or snake feed array is known in the art, a description of such a device being included in a published article, "Survey of Electronically Scanned Antennas," by Harold Shnitkin, at pp. 70 and 71 of the December 1960 issue of Microwave Journal, published by Horizon House, Inc., 1330 Beacon St., Brookline, Mass.

Figure 2:
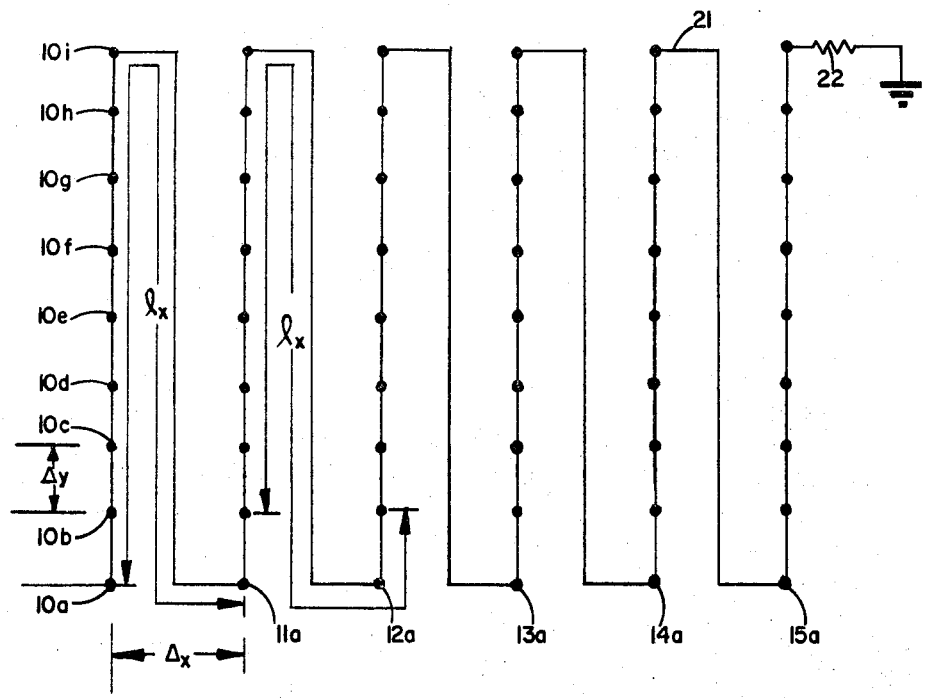
FIG. 2 is a diagram of a regularly folded feedline having a plurality of radiating apertures, illustrating the concept of the invention.

By means of the concept of the subject invention, the single-plane scanning, folded feedline of FIG. 1 may be adapted to provide a dual plane scanning function, as shown in FIG. 2.

Referring now to FIG. 2, there is illustrated a schematic diagram of a microwave circuit embodying one aspect of the invention. There is provided a continuous feedline 21, such as a waveguide section, folded back upon itself at regular intervals to form a continuous series of substantially U-shaped waveguide sections having their longitudinal axes disposed in a single plane the arms of alternate U-shaped sections being aligned substantially parallel to each other. One end of the folded wave section 21 serves as an input-output terminal while the other end thereof is terminated in a single load impedance 22. The waveguide 21 is provided with a matrix array of apertures 10, 11, 12, 13, 14 and 15 in a wall thereof parallel to the plane of the longitudinal axes of the waveguide sections. In FIG. 2 the apertures are uniformly spaced along a like arm of alternate U-shaped waveguide sections of the waveguide wall in a first linear array of columns (denoted by an alphabetical series of reference characters, such as for example, 10a, 10b, 10c, 10d, 10e, 10f, 10g, 10h and 10i); the corresponding radiating elements of each such lineal array (denoted by a numerical series of reference characters, such as for example, 10a, 11a, 12a, 13a, 14a and 15a), comprising a second lineal array of rows mutually orthogonal with the first mentioned array.

The incremental time delay associated with the uniform dimension $\Delta y$ between the uniformly spaced radiating elements of each column corresponds to an integer number of waveguide half-wavelengths ($n\lambda_g/2$) of a selected broadside frequency $f_0$, the delay or time-phase associated with the $\Delta x$ dimension (between the uniformly-spaced, corresponding elements of each row) corresponding to a substantially greater number of waveguide half-wavelengths than provided between adjacent elements of each column. Further, in a specific design, the incremental time delay associated with the uniform dimension $\Delta y$ corresponds to the function, $$\Delta y \leq \frac{\lambda}{1+\sin \theta}$$

where:

$\theta$ = a selected maximum desired scan angle off the broadside direction in the plane containing the dimension $\Delta y$, and $\lambda$ = the free space wavelength corresponding to the highest operating frequency in a set of scanned frequencies.

Hence, the diagram of FIG. 2 represents a folded microwave line source providing a matrix of uniformly spaced rows and columns of microwave radiating elements, the time delay between adjacent radiating elements in each of the rows and columns, respectively, being equal, the time delay between adjacent elements of each of the rows being substantially greater than that between adjacent elements of the columns.

When an input terminal 23 of the arrangement of FIG. 2 is operatively connected to a source (not shown) of microwave energy at a broadside frequency $f_0$, the energy radiated from each of the radiating elements comprising the matrix of elements of FIG. 2, will be mutually in phase. In other words, the wave front radiated from the device of FIG. 2 will be parallel with the plane of FIG. 2 and propagated perpendicularly thereto, which direction of propagation corresponds to the direction of, and is parallel with, the beam center or boresight axis of the antenna radiation pattern.

In normal operation of the arrangement of FIG. 2 in cooperation with a source of microwave energy, the frequency of which is progressively varied or scanned about the broadside frequency in a cyclical manner, the beam center will be cyclically steered in a direction having a first angular component lying in a plane parallel to the first linear array of columns and perpendicular to the plane of FIG. 2; and further having a second angular component lying in a plane parallel to the second linear array of rows and mutually orthogonal to the first mentioned plane. The scan rate or rate at which the direction of the steerable directive antenna beam is changed or steered is a function of the geometry of the antenna and the frequency scan rate, as is well understood in the art.

Because the phase or time-delay spacing between adjacent elements of the second linear array is much larger than that between adjacent elements of the first linear array, it is to be understood that cyclical rate at which the second angular component scans in response to a given frequency scan rate will be much faster than the corresponding cyclical rate at which the associated first angular component scans. Therefore, a given solid angle or cone of surveillance may be more rapidly scanned by a frequency-sensitive or electronically scanned antenna than by use of mechanical or electro-mechanical scanning means. Further, such dual-plane scanning is accomplished by a single efficient continuous transmission line means in which the radiating elements of the radiation matrix are serially connected, the array of each column comprising a delay element between two adjacent radiating elements of each row of radiating elements. In this way, separate helix structures or added sinuous arrays are avoided and only a single termination impedance 22 is required, thereby provided an economical, lightweight and efficient dual-plane frequency sensitive structure.

Although the radiating elements of FIG. 2 have been illustrated as forming a matrix of uniformly spaced rows and columns for ease of exposition in explaining the operation of the invention, such arrangement is not a necessray condition to practicing the concept of the invention. It may be desirable, for example, to have adjacent columns mutually shifted axially, or in the direction of the columnar lineal array, so as to provide a selected aperture, or near-field, phase and amplitude distribution for the purpose of providing a desired far-field pattern or antenna beamshape for suppressing sidelobes and the like. In such an arrangement, adjacent radiating elements would provide a series of triangular patterns rather than a matrix of uniformly spaced rows and columns of elements. Further, such adjacent columns of arrays need not have a like number of elements, but selected ones may be shortened by omitting terminal elements in order to provide a selected amplitude shaping of the near field, or aperture amplitude distribution, for beam shaping purposes. Moreover, such phase-distribution and amplitude distribution or shaping techniques may be practiced in combination without deviating from the concept of the invention, it merely being necessary that the continuous folded feedline be uniformly folded back upon itself at regular intervals, whereby corresponding points of a corresponding parallel arm of two alternate U-sections of the feedline are spaced apart in circuit, a like preselected spacing.

Figure 3:
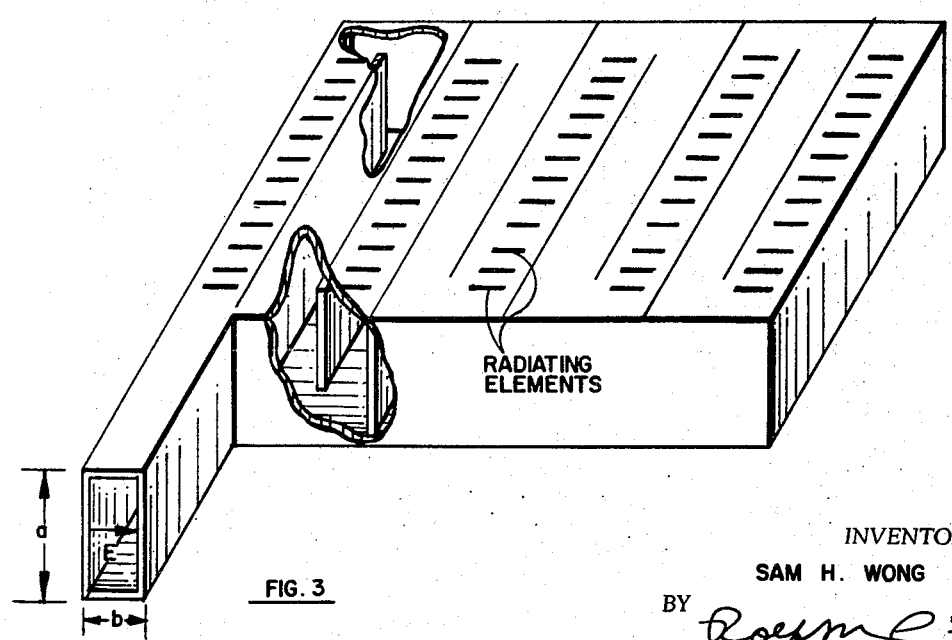
FIGS. 3 and 4 are alternative embodiments of the concept of FIG. 2.
Figure 4:
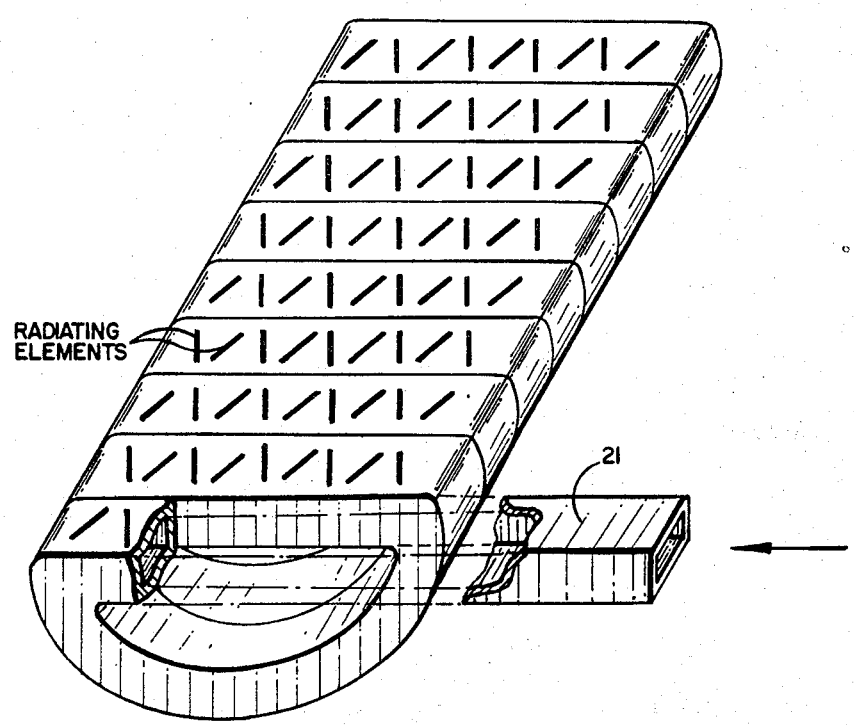

The schematic folded, continuous, feedline of FIG. 2 may, in an exemplary embodiment, be constructed in any one of a number of different forms, such as the two dimensional scan sinuous line source of FIG. 3, and the two-dimensional scan semicircular helical line source of FIG. 4. Alternatively, the transmission or delay line may be shaped like a circular helix, elliptical helix, rectangular helix or periodic impedance delay line. Further, such forms may be either of waveguide sections or strip lines, the detail design of a specific antenna depending upon the installation provisions or space available, the desired antenna aperture, frequency dispersion, and power handling capacity.

The frequency-controlled dual-plane scanning antenna devices of FIGS. 2, 3 and 4, where employed to provide a steerable directional antenna pattern, enable the determination of the components of the direction angle or target angle of a detected target as an analog function of the frequency of the transmitted radar energy. Such position angle, of course, can be no more precise than the beamwidth of the beam of energy illuminating the detected target. However, a side-by-side arrangement of at least two of the antenna devices of FIGS. 2, 3 and 4 may be employed in a monopulse application to additionally determine the angular position of the target relative to the beam center of the combined beam provided by such side-by-side arrangement, as shown in FIG. 5.

Figure 5:
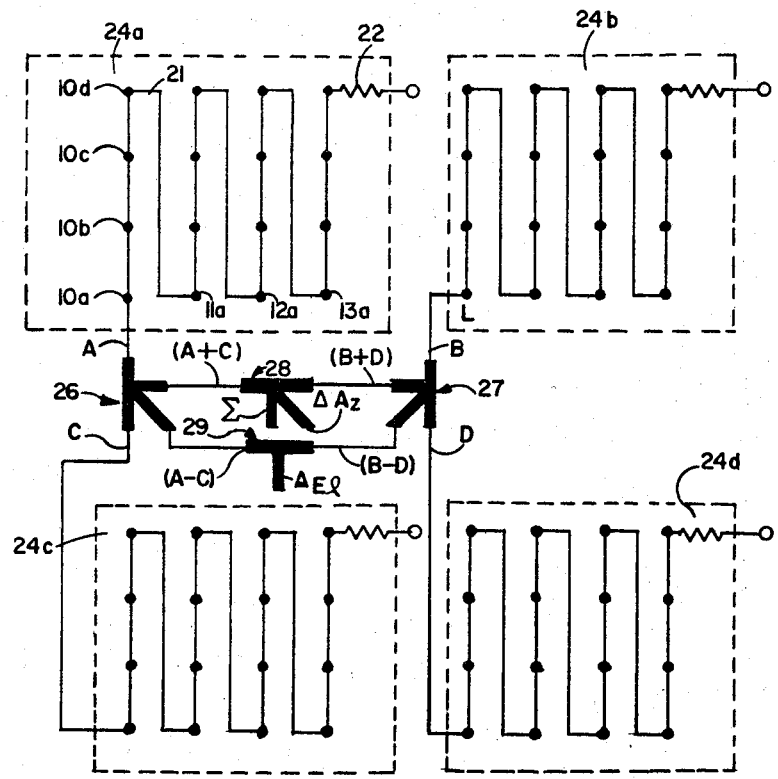
FIG. 5 is a schematic diagram of a monopulse antenna arrangement embodying the concept of the invention.

Referring to FIG. 5, there is illustrated a monopulse arrangement embodying the concept of the invention. There is provided four of the devices of FIG. 2, arranged in a side-by-side arrangement, a first and second antenna device 24a and 24b forming an upper pair of antennas, a third and fourth devices 24c and 24d forming a lower pair, the first and third devices 24a and 24c and the second and fourth devices 24b and 24d forming a respective left and right pair of antennas. There is further provided differentially combining signalling means for providing an output indicative of the difference between the signals received by a pair of adjacent antennas. Where such signal combining of the received echoes of frequency-scanned signals is performed at the microwave frequency level (rather than at a controlled intermediate frequency level), broad band microwave combining means may be used such as the well-known folded magic tee, which provides a first and second signal indicative of the respective sum and difference of two applied input signals.

Where microwave processing of the received signals may be employed in the arrangement of FIG. 5, the inputs of a first and second magic tee 26, and 27 are connected to the feedline terminals of the antennas of a respective left and right pair of antennas, each tee providing separate outputs indicative of the respective monopulse sum of and (elevation) difference between the outputs of an associated pair of antennas. A third magic tee 28, responsively coupled to the sum channel outputs of the left and right hybrids 26 and 27, provides a combined monopulse sum signal ($\Sigma = A + B + C + D$) and a monopulse azimuth difference signal ($\Delta Az = (A+C) - (B+D)$). A fourth magic tee 29 coupled to the elevation difference channel outputs of the first and second hybrids 26 and 27 provides a sum channel output corresponding to a combined monopulse elevation difference signal ($\Delta El = (A+B) - (C+D)$).

The four antennas corresponding to four phase-spaced feedhorns of a monopulse antenna, the difference signal outputs ($\Delta El$ and $\Delta Az$) of the device of FIG. 5 may be processed in the manner illustrated and described at p. 57 of "Introduction to Monopulse" by Rhodes, published by McGraw-Hill (1959), in order to obtain a signal indicative of the angle-off-boresight of a detected target, the processed sum channel ($\Sigma$) signal being suitable for display purposes.

The sum channel ($\Sigma$) terminal of magic tee 28 may alternatively be coupled to a pulsed source of power-to-be-transmitted to commonly excite all four feedhorns 24a, 24b, 24c and 24d mutually in phase, as is well understood in the art. Hence, by periodically applying a frequency-scanned source of transmitter power to the sum channel of magic tee 28, a radar system having dual-plane scanning and dual-plane monopulse capabilities is achieved, whereby the direction of a detected target within a steerable beam may be determined.

Hence, it is to be appreciated that the device of the invention relates to an efficient, regularly folded feedline structure for providing inertia-less, frequency controlled dual-plane scanning.

Because of such inertia-less dual-plane scanning feature, the scan rate of a radar system may be substantially increased, and the weight, space and complexity, thereof reduced. Further, the use of a single, regularly-folded feedline, in which the waveguide wavelength spacing of a lineal array along a folded section comprises the waveguide wavelength spacing between corresponding portions of successive sections of the sinuous feedline, provides a highly efficient structure, requiring only a single terminating (power-dissipating) impedance. Moreover, such efficient arrangement can be conveniently combined into a monopulse arrangement. Accordingly, an improved dual-plane scanning antenna has been described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A frequency-controlled dual-plane scanning antenna comprising a single continuous regularly folded radiating feedline of serially interconnected sections, alternate ones of said sections having a lineal-array of radiating apertures, said arrays being mutually co-planar.

2. A frequency-sensitive scanning antenna for scanning in two manually orthogonal directions, the scanning speed in one of said directions being greater than in the other of said directions, said antenna comprising
a single continuous folded microwave radiating line source providing a coplanar matrix of rows and columns of uniformly spaced microwave radiating elements, the time delay between adjacent radiating elements in said rows and columns respectively being equal.

3. A frequency-sensitive scanning antenna for scanning in two mutually orthogonal directions, the scanning speed in one of said directions being greater than in the other of said directions, said antenna comprising
a single continuous folded microwave radiating line source providing a coplanar matrix of rows and columns of uniformly spaced, serially-connected microwave radiating elements, the time-phase delay between adjacent elements in said rows and columns respectively being equal, the time delay between adjacent elements of each of said rows being substantially greater than that between adjacent elements of said columns.

4. The device of claim 3 in which the time delay between adjacent elements of each of said rows is an integer multiple of that between adjacent elements of said columns.

5. An antenna for scanning a desired region in space with a beam of electromagnetic wave energy in response to variations in wavelength of the electromagnetic waves, said antenna including a length of waveguide folded back upon itself at substantially regular intervals to form a continuous series of substantially U-shaped waveguide sections having their longitudinal axes disposed in a single plane, the arms of alternate U-shaped sections of said series being aligned substantially parallel to each other, said waveguide being provided with a matrix array of apertures in a wall thereof parallel to the plane of the longitudinal axes of said waveguide sections,
said apertures being uniformly spaced along a like arm of alternate U-shaped waveguide sections of said waveguide wall in like linear arrays of apertures, the spacing between any two adjacent apertures of a given array being an integral number of waveguide wavelengths of said electromagnetic waves, the spacing between corresponding apertures of adjacent arrays being at least twice that between the first and last apertures of one of said arrays.

6. An antenna for scanning a desired region in space with a beam of electromagnetic wave energy in response to variations in wavelength of the electromagnetic waves, said antenna including a length of waveguide folded back upon itself at substantially regular intervals to form a continuous series of substantially U-shaped waveguide sections having their longitudinal axes disposed in a single plane, the arms of alternate U-shaped sections of said series being aligned substantially parallel to each other, said waveguide being provided with a matrix array of apertures in a wall thereof parallel to the plane of the longitudinal axes of said waveguide sections,
said apertures being uniformly spaced along a like single arm of alternate U-shaped waveguide sections of said waveguide wall in like linear arrays, forming a matrix of rows and columns of apertures, the spacing between any two adjacent apertures of a given row or column being an integral number of waveguide wavelengths of said electromagnetic waves.

7. A frequency-controlled dual-plane scanning monopulse antenna assembly comprising
at least two frequency-controlled dual-plane scanning antennas; and
first differentially combining signalling means for providing an output indicative of the difference between the signals received by said antennas; and
each said antenna comprising a regularly folded feedline having a coplanar plurality of lineal arrays of radiating elements.

8. A frequency-controlled dual-plane scanning monopulse antenna assembly comprising
at least two frequency-controlled dual-plane scanning antennas; and
differentially combining signalling means for providing an output indicative of the difference between the signals received by said antennas,
each said antenna comprising a single continuous folded feedline having a matrix of rows and columns of uniformly spaced radiating elements, a first uniform phase spacing between adjacent elements of each column, a second uniform spacing between adjacent elements of each row.

9. A frequency-controlled dual-plane scanning, dual-plane monopulse antenna assembly comprising
four frequency-controlled dual-plane scanning antennas,
a first and second one of said antennas comprising an upper pair of antennas,
a third and fourth one of said antennas comprising a lower pair of antennas,
said first and third ones and said second and fourth ones comprising a respective left and right pair of antennas;
first differentially-combining signalling means for providing an output indicative of the difference between the signals received by said upper and lower pairs of antennas; and
second differentially-combining signalling means for providing an output indicative of the difference between the signals received by said left and right pairs of antennas;
each said antenna comprising a single continuous folded feedline having a matrix of rows and columns of uniformly spaced radiating elements, a first uniform phase spacing between adjacent elements of each column, a second uniform spacing between adjacent elements of each row.

References Cited

UNITED STATES PATENTS

| | | | |
|---|---|---|---|
| 2,676,257 | 4/1954 | Hebenstreit | 343—771 |
| 2,409,944 | 10/1946 | Loughren | 343—854 |
| 3,020,549 | 2/1962 | Kales et al. | 343—771 |
| 3,039,097 | 6/1962 | Strumwasser et al. | 343—771 |
| 3,220,007 | 11/1965 | Thourel | 343—771 |

FOREIGN PATENTS 983,033  2/1951  France.

ELI LIEBERMAN, *Primary Examiner.*

U.S. Cl. X.R.

343—771, 853